Patented Apr. 28, 1953

2,636,872

UNITED STATES PATENT OFFICE 2,636,872

VINYL CHLORIDE POLYMER DISPERSIONS AND PROCESS OF MAKING SAME

Raymond W. James, Lexington, and David W. Lovering, Needham, Mass., assignors to Arthur D. Little, Inc., Cambridge, Mass., a corporation of Massachusetts No Drawing. Application September 13, 1950, Serial No. 184,714

14 Claims. (Cl. 260—33.6)

This invention relates to the coating of webs with a vinyl chloride polymer including polyvinyl chloride and its co-polymers, and is a continuation-in-part of our United States application Ser. No. 92,955 filed May 12, 1949.

Two processes in wide use for applying coatings may be termed the "solution" method and the "solid" method. Each may have its peculiar advantages and disadvantages for a given coating composition and end product. In general the solvent method consists in dissolving or dispersing the resin in a volatile medium and applying the resulting product to a web, while the solid method consists of producing proper coating characteristics of heating or mechanically working the material.

Though one or the other of these methods may be quite satisfactory for some materials, they are not particularly satisfactory for the polymers of this invention. The solid coating process is usually carried out by working the polymer on a rubber mill or a Banbury mixer at high temperatures to get a mass of proper plasticity for coating purposes. During coating the mixture may be held at temperatures in the order of from 300 to 350° F. for considerable periods of time. Such temperatures may not easily be attainable by usual equipment so that special heating equipment may be necessary. Aside from the undesirable and not inconsiderable cost factor incident to the use of such temperatures, the principal difficulty resides in the alteration in the polymer itself. Hydrochloric acid may split out, and discoloration and embrittlement, or excessive softening follow even though precaution is taken to use a heat stabilizer.

But solution coating is also not satisfactory when applied to vinyl chloride polymers containing more than 92% vinyl chloride. Such polymers, however, when applied provide coatings of a superior character. Useful volatile solvents available (principally high boiling ketones) do not make good solutions of these vinyl chloride polymers at room or slightly elevated temperatures, but produce a gel-like product which does not lend itself to ordinary coating techniques. Coating has also been attempted at elevated temperatures of at least 160° F. While this procedure makes coating possible, there is an excessive use of solvents. For instance, for polyvinyl chloride the maximum advisable resin content is 12% in methyl ethyl ketone at 160° F. Thus a considerable amount of solvent must be evaporated during the drying process. Because they are all high cost and the majority of the useful solvents may not be successfully recovered, the process is prohibitively expensive. Furthermore the solvents are all difficult to remove completely and they may accelerate decomposition of the coating on standing even when present in minute amounts.

Dispersion techniques have been proposed which depend upon the use of delicately balanced ratios of organic non-solvents and swelling agents. Such processes require long periods of ball milling and result in a product with little internal cohesion i. e., ready ability to spread into a continuous sheet.

It is an object of this invention to prepare a suitable coating composition of a vinyl chloride polymer which may be readily applied and which is economical to prepare.

It is a further object to produce coated products which are superior to those obtained by conventional methods.

Other objects will appear from the following disclosure.

Briefly these objects may be accomplished by milling 100 parts by weight of the polymer, together with whatever amount of pigment is desired, with from 50 to 80 parts of a plasticizer mixture containing from 1 to 15% by weight of a solvent for the resin, until the proper coating consistency is obtained. Completion of the milling step is determinable when partial solvation is attained. The viscosity of the mixture may be subsequently regulated with an organic non-solvent such as a hydrocarbon. The product is applied to a web in any suitable manner, as with a coating knife, and fluxed to produce complete solvation and a durable and attractive product.

In order to more clearly define what is meant by partial solvation, the following discussion is given. A resin, for example a vinyl chloride-vinyl acetate copolymer, in the solid, finely powdered condition may be dispersed in a non-solvent to give a suspension. The resin particles settle rapidly, the suspension has a low viscosity and no tendency to sheet as the particles would separate when the liquid is removed. If a poor solvent is used as a dispersing agent, the particles of resin will, if the particle size is sufficiently fine and thorough mixing is attained, be partially swelled or solvated but will remain as discrete particles. These particles will be dispersed in the liquid resulting in a suspensoid type colloidal solution. However, they will have the property of length and be satisfactory for knife coating. If a reasonable amount of a solvent is used to treat the resin, or a large amount of a poor solvent thoroughly worked with the resin, the resin becomes completely solvated. In this state the solution becomes an emulsoid solution. Such emulsoids are always much more viscous than suspensoids. If an excess of a very powerful solvent is employed, a true solution may be obtained which is less viscous than the emulsoid type solution.

A standard for determining whether or not a material is a solvent or non-solvent for the resin has been established for use in the specification and in the appended claims. A standard for determining whether or not a material is a solvent or plasticizer has also been determined. A volatile solvent is distinguished from a plasticizer and on the basis of volatility, i. e. by volatile solvent is meant a material having an evaporation at least as great as that of dimethyl phthalate, and by plasticizer is meant a material having an evaporation less than that of dimethyl phthalate.

A solvent is an organic liquid having an evaporation rate at least as great as that of dimethyl phthalate and when mixed in the ratio of nine parts with one part of finely divided resin by weight, the mixture stirred and heated to 302° F. or in the case of a solvent having a boiling point less than 302° F. to just below its boiling point, and cooled to room temperature results in a sol. A sol is a colloidal organic solution having a zero yield point. A non-solvent plasticizer is an organic liquid having an evaporation rate less than that of dimethyl phthalate when mixed with finely divided resin in the ratio of nine parts of plasticizer to one part of resin by weight, stirred and heated to 302° F., and cooled to room temperature, will result in a gel. A gel is a colloidal organic solution having a measurable yield point.

The partial solvation of the resin which is an essential feature of the above described process, may therefore be defined as a condition in which particles of resin have been swollen by the action of solvent but have not been swollen to the extent that the resin particles have lost their identity. But for the process to operate, the particle size of the partially solvated particles must be small, i. e., in the order of the resin described in the examples.

It has been found that a mixture of a small amount of a good solvent for the resin in a large amount of non-solvent plasticizer when mixed together have an effect on the resin which is similar to a poor solvent. Thus partial solvation may be secured with such a combination. Examples of good solvents for the resin include relatively low boiling ketones as a class, as well as some other materials such as nitro benzene. Among the ketones which are suitable for the process just described are:

Cyclohexanone
Methyl n-amyl ketone
Methyl isobutyl ketone
Acetonylacetone
Hexanedione 2,5

The solvent must be present in the plasticizer mixture to the extent of at least about .5 part by weight on the resin, the mixture of non-solvent plasticizer and solvent amounting to not more than 80 parts by weight per 100 parts of the resin. Though the range of plasticizer mixture to be incorporated is in the order of 50 to 80 parts by weight on 100 parts of the resin, and will give reasonably satisfactory products, the optimum amount to yield a desired result with any given polymer and plasticizer must be determined experimentally. Such factors as the amount and kind of pigment employed, the temperature at which the milling operation is carried out, the particular plasticizer mixture employed and the end product desired all affect the quantity to be used.

The milling may be advantageously accomplished on any standard three roll mill, although a mill containing more than three rolls is also satisfactory; it may also be accomplished in a ball mill or a Banbury mixer.

The time necessary to obtain the proper consistency using only a three roll mill varies with the amount of material, the setting of the rolls, the temperature of operation, the speed of operation, the kind and amount of plasticizer and the size of the apparatus. Partial solvation may usually be obtained with from 3 to 5 passes though with less effective plasticizers the grinding should be continued further. Using a ball mill alone the process requires about twenty-four hours. A desirable method of operation consists of milling the plasticizer, pigment and resin in a ball mill from 2 to 8 hours and then putting the mixture through a three roll mill one or two times.

When the milling is completed, the plasticized polymer is applied directly to a web, as by a doctor knife. If the coating requires thinning, the composition may be thinned with a volatile non-solvent for the resin such as a petroleum hydrocarbon fraction, for example, gasoline. The amount of petroleum thinner may vary from 0 to about 25% on the weight of solids.

After the material has been applied it is "fluxed." This process, which is well known in the art, consists of heating the material for a short time until it has become homogeneous. Such temperatures of heating may be from 250–400° F. It is neither necessary nor particularly desirable to remove the volatile non-solvent prior to fluxing. The fluxing step completely solvates the resin thus giving a homogeneous and tough product. The fluxing step also serves to remove the solvent from the resin thus producing a finer coated product which contains neither solvent nor solvent plasticizer. It can readily be appreciated that the absence of any solvent for the resin yields a product which is completely free from tackiness.

In order to understand the process of this invention more clearly the following general method of treating the resin and coating is given.

To 100 parts of the resin is added from 0 to 100 parts of pigment and/or filler and from 50 to 80 parts of plasticizer mixture containing at least .5 part by weight of resin solvent. The mixture is passed and repassed through a three roll mill until the mass assumes a uniform and sufficiently fluid character. The non-solvent volatile fluid is added slowly up to 25 parts by weight with rapid agitation until the proper viscosity is secured. The resulting material is then applied to the web and "fluxed."

The following examples of formulations and procedures which are particularly desirable are illustrative. Parts are by weight.

I

| Materials: | Function |
|---|---|
| 100 parts VYNU [1] | resin |
| 75.2 parts Flexol 4GO (polyethylene glycol di-2-ethyl hexoate). | non-solvent plasticizer |
| 4.8 parts cyclohexanone | solvent |
| 12.0 parts basic lead carbonate | pigment |
| 18.0 parts chrome green | Do. |
| 30.0 parts Asbestine (commercial magnesium silicate). | filler |

[1] VYNU—A vinyl chloride-vinyl acetate copolymer containing 95% vinyl chloride, the particles of which are substantially all less than 10 microns in diameter.

The non-solvent plasticizer and solvent are mixed, added to the above solid materials, and passed through a three roll mill three times. Twenty parts of gasoline are mixed by agitation until the mixture is of uniform consistency. It is then applied to cloth by knife coating to the extent of about two pounds per square yard. The coated cloth is placed between platens which are heated to 350° F. and pressed at 100 pounds per square inch pressure for 10 seconds. The finished product is a flexible, glossy, tough, and tightly adhering coating.

II

Materials: | Function
--- | ---
100 parts VYNU | resin
68 parts hydrogenated methyl abietate (Hercolyn). | non-solvent plasticizer
12 parts methyl n-amyl ketone | solvent
12 parts basic lead carbonate | pigment
18 parts chrome green | Do.
30 parts Asbestine | filler The non-solvent plasticizer and solvent are mixed together and, with the above solid materials, are ground on a three roll mill with five passes. The product is then applied from a three roll friction calendar on paper to the extent of about 6 ounces per square yard and finally fluxed by passing through polished calendar rolls heated to 350° F. The product is a glossy, tough paper product.

III

Materials: | Function
--- | ---
100 parts VYNU | resin
5 parts nitrobenzene | solvent
75 parts KP 120 (methoxyglycol acetyl ricinoleate). | non-solvent plasticizer
12 parts basic lead carbonate | pigment
18 parts chrome green | Do.
30 parts Asbestine | filler The non-solvent plasticizer and solvent are mixed and incorporated with the above solid materials which are then ground together in a ball mill for 4 hours and finally passed once through a three roll mill. The composition is diluted with 25 parts of mineral spirits. Applied to a cotton fabric as in Example I, a similar product is obtained.

IV

Materials: | Function
--- | ---
100 parts VYNU | resin
49 parts KP 120 (methoxyglycol acetyl ricinoleate). | non-solvent plasticizer
1 part acetonylacetone | solvent The non-solvent plasticizer and the solvent are mixed and, with the above solid materials, are ground in a ball mill for 24 hours, diluted with 10 parts of water and coated as in Example I. A water white tough product results.

V

Materials: | Function
--- | ---
100 parts VYNU | resin
0.5 part hexanedione-2,5 | solvent
79.5 parts Flexol 4GO polyethylene glycol di-2-ethyl hexoate). | non-solvent plasticizer The non-solvent plasticizer and the solvent are mixed and are ground together with the pigment on a three roll mill by 4 passes. The coating composition was similar in characteristics to that of Example IV when similarly diluted.

VI

Materials: | Function
--- | ---
100 parts diethyl maleate-vinyl chloride 5:95 copolymer. | resin
10 parts cyclohexonone | solvent
70 parts 4GO (polyethylene glycol di-2-ethyl hexoate). | non-solvent plasticizer The solvent and non-solvent plasticizer are mixed and added to the resin. After thoroughly incorporating the plasticizer mixture with the resin it was run through a three roll mill three times to yield a dispersion having the character of being free flowing, and good length. Upon standing the resin dispersion remained stable, and when knife coated and fluxed made a good product.

VII

Materials: | Function
--- | ---
100 parts polyvinyl chloride resin (average particle size less than 10 microns in diameter). | resin
49 parts Flexol 4GO (polyethylene glycol di-2-ethylhexoate). | non-solvent plasticizer
1 part cyclohexonone | solvent The non-solvent plasticizer and solvent are mixed and added to the resin. The resin and plasticizer are thoroughly mixed and then run through a three roll mill several times to yield a dispersion having the character of being free flowing, and good length. The dispersion was knife coated on a smooth glass plate and fluxed. The resulting mixture was a tough, transparent film.

VIII

Materials: | Function
--- | ---
100 parts polyvinyl chloride resin (average particle size less than 10 microns in diameter). | resin
50 parts Flexol 4GO (polyethylene glycol di-2-ethyl hexoate). | non-solvent plasticizer
5 parts cyclohexonone | solvent The procedure of Example VII was followed to yield a very similar product.

It may be seen that by the process of this invention the disadvantages incident to the use of large quantities of solvents which must be removed are obviated. The mixture coats easily and has sufficient "length." By length is meant that characteristic of a coating composition which permits spreading to form a continuous film. An example of a "short" material is the familiar gelatin dessert which, if coating were attempted, would break and fail to spread.

The use of a solvent is essential to this invention but is to be clearly distinguished from the use of solvents as used in the prior art. The solvent employed by the method of this invention is employed in such small quantities that it is entirely removed in the fluxing step. It is thus much easier to obtain the desired characteristics of the finished product. Furthermore, the undesirable and expensive step of removing and recovering large quantities of solvent is eliminated. The solvent must also be mixed with the non-solvent plasticizer before addition to the resin.

It is believed to be a feature of this invention that incomplete solvation is achieved in the mixing. Complete solvation is believed to be reached during the fluxing step before the solvent is removed. The process of this invention for producing a coating composition differs from the known use of solvents and/or solvent plasticizers in that by calendering and solvent application processes substantially complete solvation is obtained prior to coating, and to reduce the viscosity considerable solvent and/or heat is necessary.

To attain the effect of partial solvation, as stated above some solvent is required but it is shown by Example V that only about .5 part by weight on 100 parts of the resin may be used. By employing such a small percentage of solvent a finished product entirely free of any tackiness may be obtained. Such a property is highly desirable for many purposes.

Compositions may be prepared containing from 0.5 to 12 parts by weight of solvent to 100 parts by weight of resin, as a particularly useful range; the exact quantity which may be optimum depends upon the particular resin, non-solvent plasticizer, and volatile solvent used.

The process of this invention may be applied to vinyl chloride resins such as polyvinyl chloride and copolymers of vinyl chloride with such materials as vinyl acetate, vinylidene chloride and maleic acid esters. Copolymers of vinyl chloride with dipropyl maleate, dibutyl maleate, diethyl fumarate, dipropyl fumarate and dibutyl fumarate are also polymers which may be advantageously formed into resin dispersions in accordance with our process. The copolymers must, however, contain not more than 15% of the copolymerizable material such as the vinyl acetate, vinylidene chloride, or maleic acid ester constituent. Polymers containing more than the percentages stated above, while they may be treated by our process, produce products which are inferior in many respects to those produced from polymers containing more than 85% vinyl chloride. Vinyl chloride-vinyl acetate copolymers containing at least 92% vinyl chloride are to be preferred for most uses. It is also essential that the polymer used be very finely divided i. e., in the order of 10 microns or less. In order that the process operate successfully the particles, as stated above, must be partially solvated.

A further observation which has been made is the apparent change in character in the mixture when various quantities of volatile hydrocarbon diluent are added. For example, when up to 25 parts of diluent to 100 parts of resin by weight are added, a mixture having considerable flow and length results with decreasing viscosity with increasing quantity of hydrocarbon diluent. If somewhat more non-solvent is added, for instance 35 parts by weight to 100 parts by weight of resin, the composition changes phase, becomes thicker and is short or "buttery" and has the characteristics of a gel. A petroleum hydrocarbon is the preferred diluent. Any person skilled in the art will easily recognize the change in character of the composition and will dilute the partially solvated resin to the proper point. The degree of solvation, the resin used and other factors affect the amount of non-solvent which may be added, but amounts up to 25% by weight of non-solvent on the resin may safely be added.

The coated fabric may be embossed by stamping or pressing to produce a satisfactory artificial leather. The product may be varied in flexibility from one which is pliable to one of considerable stiffness depending upon the material coated and the particular coating composition employed. Thus, because of the toughness and range of flexibility of the finished product, it is useful for coverings of automobile seats, outdoor furniture, etc. Because it is waterproof, light, and relatively economical, it is an ideal material for many uses to which rubber is put such as raincoats, and other weather protecting coverings.

We claim:

1. A composition comprising a resin and a plasticizer mixture, said resin being a vinyl chloride polymer consisting of at least 85% by weight of vinyl chloride in the form of particles having an average diameter of less than 10 microns, said plasticizer mixture consisting of a solvent for the resin and a non-solvent plasticizer, and being present in an amount of about 50 to 80 parts by weight on 100 parts of resin, said composition being characterized by containing from 0.5 to 15% by weight on the resin of said solvent, by the resin being partially solvated and by having the coating characteristic of substantial length, said solvent being an organic liquid having an evaporation rate at least as great as that of dimethyl phthalate and when mixed in the ratio of nine parts with one part of said finely divided resin by weight, the mixture stirred and heated to just below its boiling point but not above 302° F. and cooled to room temperature, the resulting mixture is a sol, and said non-solvent plasticizer being an organic liquid having an evaporation rate less than that of dimethyl phthalate, and when mixed with said resin in the ratio of nine parts of plasticizer to one part of resin by weight, stirred and heated to 302° F. and cooled to room temperature, the resulting mixture is a gel.

2. The composition in accordance with claim 1 wherein the resin is a member of the group consisting of polyvinyl chloride, vinyl chloride-vinyl acetate copolymer, vinyl chloride-vinylidene chloride copolymer, and vinyl chloride-maleic acid ester copolymer.

3. The composition in accordance with claim 1 wherein the polymer is polyvinyl chloride.

4. The composition in accordance with claim 1 wherein the polymer is a copolymer of vinyl chloride and vinyl acetate.

5. The composition in accordance with claim 1 wherein the polymer is a copolymer of vinyl chloride and maleic acid ester.

6. The composition in accordance with claim 1 wherein the vinyl chloride content of the polymer is at least 92%.

7. The composition in accordance with claim 1 wherein the vinyl chloride content of the polymer is at least 95%.

8. The process of preparing a resin coating composition which comprises milling together 50 to 80 parts by weight of plasticizer mixture and 100 parts by weight of finely divided vinyl chloride polymer having an average particle size not more than 10 microns in diameter and consisting of at least 85% by weight of vinyl chloride until partial solvation is secured and until the composition has substantial length, and adding up to 25% by weight on the resin a volatile petroleum hydrocarbon, said plasticizer mixture consisting of between 0.5 to 15% by weight on the resin of solvent for said resin plus a non-solvent plasticizer, said solvent being an organic liquid having an evaporation rate at least as great as that of dimethyl phthalate and when mixed in the ratio of nine parts with one part of said finely divided resin by weight, the mixture stirred and heated to just below its boiling point but not above 302° F. and cooled to room temperature the resulting mixture is a sol, and said non-solvent plasticizer being an organic liquid having an evaporation rate less than that of dimethyl phthalate, and when mixed with said resin in the ratio of nine parts of plasticizer to one part of resin by weight, stirred and heated to 302° F. and cooled to room temperature the resulting mixture is a gel.

9. The process of preparing a resin coating composition which comprises milling together 50 to 80 parts by weight of plasticizer mixture and 100 parts of finely divided resin of the group consisting of polyvinyl chloride, vinyl chloride-vinyl acetate copolymer, vinyl chloride-vinylidene chloride copolymer, and vinyl chloride-maleic acid ester copolymer wherein said copolymers consist of at least 85% by weight of vinyl chloride, said resin having an average particle size not more than 10 microns in diameter, until partial solvation is secured and until the composition has substantial length, and adding up to 25 parts by weight on 100 parts of the resin a volatile petroleum hydrocarbon, said plasticizer mixture consisting of between 0.5 and 15% by weight on the resin of solvent for said resin plus a non-solvent plasticizer, said solvent being an organic liquid having an evaporation rate at least as great as that of dimethyl phthalate and when mixed in the ratio of nine parts with one part of said finely divided resin by weight, the mixture stirred and heated to just below its boiling point but not above 302° F. and cooled to room temperature the resulting mixture is a sol, and said non-solvent plasticizer being an organic liquid having an evaporation rate less than that of dimethyl phthalate, and when mixed with said resin in the ratio of nine parts of plasticizer to one part of resin by weight, stirred and heated to 302% F., and cooled to room temperature the resulting mixture is a gel.

10. The process according to claim 9 wherein the polymer is polyvinyl chloride.

11. The process according to claim 9 wherein the polymer is a vinyl chloride-vinyl acetate copolymer.

12. The process according to claim 9 wherein the polymer is a vinyl chloride-vinylidene chloride copolymer.

13. The process according to claim 9 wherein the polymer is a vinyl chloride-maleic acid ester copolymer.

14. The process of preparing a coated product which comprises milling together 50 to 80 parts by weight of a plasticizer mixture and 100 parts of a finely divided vinyl chloride polymer having an average particle size not more than 10 microns in diameter until partial solvation is secured and until the composition has substantial length, said plasticizer mixture consisting of between 0.5 and 15% by weight on the resin of solvent for said resin plus a non-solvent plasticizer, said resin consisting of at least 85% vinyl chloride, said solvent being the only solvent for the resin employed in the process, said process being characterized by employing a volatile petroleum hydrocarbon as a diluent in an amount of up to 25 parts by weight on 100 parts of the resin, coating a web with the partially solvated resin, and finally subjecting the coating to a temperature of between 250° F. and 400° F. to completely solvate the resin, said solvent being an organic liquid having an evaporation rate at least as great as that of dimethyl phthalate and when mixed in the ratio of nine parts with one part of said finely divided resin by weight, the mixture stirred and heated to just below its boiling point but not above 302° F. and cooled to room temperature the resulting mixture is a sol, and said non-solvent plasticizer being an organic liquid having an evaporation rate less than that of dimethyl phthalate, and when mixed with said resin in the ratio of nine parts of plasticizer to one part of resin by weight, stirred and heated to 302° F. and cooled to room temperature the resulting mixture is a gel.

RAYMOND W. JAMES.
DAVID W. LOVERING.

References Cited in the file of this patent

UNITED STATES PATENTS

| Number | Name | Date |
| --- | --- | --- |
| 2,427,513 | Spessard | Sept. 16, 1947 |
| 2,431,078 | Powell et al. | Nov. 18, 1947 |
| 2,507,688 | Armstrong | May 16, 1950 |

OTHER REFERENCES

Plasticizers, Carbide & Carbon Corp., 1944, pp. 12 and 13.

Synthetic Organic Chemicals, Carbide & Carbon Corp., July 1, 1946, pp. 50 and 52.

Burleson: Plastics V. S. A., Aug. 1947, pp. 18, 21, 24, and 25.

Powell et al.: Official Digest No. 263, Dec. 1946 (Federation of Paint and Varnish Production Clubs).

Burleson: Rubber Age, January 1948, pp. 417–419 and 423.